(12) United States Patent
D'Acunto et al.

(10) Patent No.: US 12,149,799 B2
(45) Date of Patent: Nov. 19, 2024

(54) STREAMING ASSISTANCE SYSTEM AND COMPUTER-IMPLEMENTED METHOD

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventors: Lucia D'Acunto, Delft (NL); Miodrag Djurica, Rotterdam (NL); Jan Willem Martin Kleinrouweler, Pijnacker (NL)

(73) Assignees: Koninklijke KPN N.V., Rotterdam (NL); Nederlandse Organisatie Voor Toegepast-Natuurwetenschappelijk Onderzoek TNO, s-Gravenhage (NL)

( * ) Notice: Subject to any disclaimer, the term of this patent is extended or adjusted under 35 U.S.C. 154(b) by 0 days.

(21) Appl. No.: 17/635,662

(22) PCT Filed: Aug. 18, 2020

(86) PCT No.: PCT/EP2020/073050
§ 371 (c)(1),
(2) Date: Feb. 15, 2022

(87) PCT Pub. No.: WO2021/032706
PCT Pub. Date: Feb. 25, 2021

(65) Prior Publication Data
US 2023/0224548 A1    Jul. 13, 2023

(30) Foreign Application Priority Data
Aug. 19, 2019 (EP) .................................... 19192251

(51) Int. Cl.
*H04N 21/61* (2011.01)
*H04N 21/6377* (2011.01)
*H04N 21/845* (2011.01)

(52) U.S. Cl.
CPC ..... *H04N 21/6125* (2013.01); *H04N 21/6377* (2013.01); *H04N 21/8456* (2013.01)

(58) Field of Classification Search
None
See application file for complete search history.

(56) References Cited

U.S. PATENT DOCUMENTS

2017/0359628 A1* 12/2017 Sachdev .......... H04N 21/44016
2020/0037045 A1*  1/2020 Mahvash .......... H04N 21/8456

FOREIGN PATENT DOCUMENTS

| EP | 3481077 A1 | 2/2017 |
| WO | WO 2018/086695 A1 | 5/2018 |
| WO | WO-2019148498 A1 * | 8/2019 ......... H04L 65/4076 |

OTHER PUBLICATIONS

Evensen, Kristian et al. "Improving the Performance of Quality-Adaptive Video Streaming over Multiple Heterogeneous Access Networks," Proceedings of the Second Annual ACM Conference on Multimedia Systems, pp. 57-68, Feb. 2011.
(Continued)

*Primary Examiner* — Cai Y Chen
(74) *Attorney, Agent, or Firm* — Hamilton, Brook, Smith & Reynolds, P.C.

(57) ABSTRACT

A streaming assistance system may be provided which may be connected to at least two network links, for example via respective network interfaces. Both network links may have different characteristics, e.g., in terms of throughput, utilization, latency, etc. The streaming assistance system may assist in the streaming of media content to a client device by identifying a media fragment which is likely to be requested by the client device in the (near) future, selecting a network link to be used for the streaming of the media segment, and effecting a prefetching of the media segment via the selected network link. In some embodiments, the streaming assis-
(Continued)

tance system may be a DASH Aware Network Element (DANE).

13 Claims, 7 Drawing Sheets

(56) References Cited

OTHER PUBLICATIONS

"Nederlandse norm NEN-ISO/IEC 23009-5(en), Information technology—Dynamic adaptive streaming over HTTP (DASH)—Part 5: Server and network assisted DASH (SAND) (ISO/IEC 23009-5:2017,IDT)," ICS 35.040.40, pp. 1-57, Feb. 2017.

"Informative technology—Dynamic adaptive streaming over HTTP (DAS)—Part 1: Media presentation description and segment formats," International Standard ISO/IEC 23009-1:2014(E), Second Edition, pp. 1-152 (2014).

European Search Report for European Application No. 19192251.7, titled: "Streaming Assistance System and Computer-Implemented Method," Dated: Jan. 2, 2020.

International Search Report and Written Opinion for Int'l Application No. PCT/EP2020/073050, titled: "Streaming Assistance System and Computer-Implemented Method," Dated: Sep. 30, 2020.

* cited by examiner

STREAMING ASSISTANCE SYSTEM AND COMPUTER-IMPLEMENTED METHOD

RELATED APPLICATIONS

This application is the U.S. National Stage of International Application No. PCT/EP2020/073050, filed on Aug. 18, 2020, which designates the U.S., published in English, and claims priority under 35 U.S.C. § 119 or 385(c) to European Application No. 19192251.7, filed on Aug. 19, 2019. The entire teachings of the above applications are incorporated herein by reference.

FIELD OF THE INVENTION

The invention relates to a streaming assistance system and computer-implemented method for assisting in a streaming of media content which is streamed, for example using an adaptive streaming technique, from one or more media servers to a client device. The invention further relates to the client device, and to a computer readable medium comprising a computer program to perform the method.

BACKGROUND ART

Media content such as video content and audio content is commonly delivered to users in digital form. If media content has a temporal aspect, and in particular is associated with a timeline which indicates how the media content is to be played-out over time, such digital form is typically referred to as a media stream.

It is known to deliver media content in temporally segmented form. For example, in case of adaptive streaming of media content, the media content may be split into temporal segments which may be individually requested by the client device. In such cases, there may be a need to prefetch segments which are anticipated to be requested by the client device to ensure uninterrupted play-out of the media content by the client device. Such prefetching may be desirable when for example the media content is transported via a network connection which has a high latency. An example of such a network connection is a satellite downlink, which may for example be used in rural areas to provide a high-bandwidth connection to a client device, such as a set-top box which may be configured to receive and then play-out the media content. However, such prefetching may also be desirable for other types of networks connections besides satellite downlinks, for example to ensure uninterrupted play-out if the network connection is during the streaming expected to be momentarily congested.

It is known to use a streaming assistance system for such prefetching. For example, when streaming the media content via Dynamic Adaptive Streaming over HTTP (DASH) [1], network operators and content providers may enhance the delivery of DASH-based video content using Server and network assisted DASH (SAND). SAND introduces the concept of DASH Aware Network Elements (DANEs), which may be network elements with minimum intelligence about DASH and awareness of DASH-formatted objects. The DANE may be intended to prioritize, parse, or even modify such objects. SAND-enabled DASH clients exchange messages with DANEs to enhance the reception and delivery of DASH content. This message exchange has been standardized in [2]. Specifically, DANEs that are in the content delivery path may be used to prefetch media content. Such DANES are also known as caching DANEs.

The above describes an example of the media content being streamed via a satellite downlink. In general, however, there may exist two or more alternative network links which may have different characteristics and via which the media content may be transported from one or more media servers to the client device. For example, a client device may use different access networks simultaneously, such as a high-bandwidth, high-latency satellite downlink and a low-bandwidth, low-latency terrestrial network link. Another example is that the client device may be connected to an access point which is connected to a core network via different backhaul networks, such as the aforementioned satellite downlink and the aforementioned terrestrial network link.

It would be desirable to optimize the streaming of media content to a client device to make use of such multiple alternative network connections.

The publication [3] describes a system for multipath delivery of video segments. In [3], the client device itself, which is a 'multi-homed client' device with the term referring to the client device being connected via multiple access networks to a core network, is configured to request segments via the respective access networks.

However, in many cases, the client device itself, or a software component running on the client device configured for the media streaming, may be unaware of the existence of such alternative network links, for example if the network links are multiple different backhaul network links, and may thus be unable to optimize the streaming of the media content to take into account such alternative network links.

REFERENCES

[1] ISO/AEC 23009-1:2014, Information technology—Dynamic adaptive streaming over HTTP (DASH)—Part 1: Media presentation description and segment formats

[2] ISO/AEC 23009-5:2017, Information technology—Dynamic adaptive streaming over HTTP (DASH)—Part 5: Server and network assisted DASH (SAND)

[3] Evensen, K., Kaspar, D., Griwodz, C., Halvorsen, P., Hansen, A., & Engelstad, P. (2011, February). Improving the performance of quality-adaptive video streaming over multiple heterogeneous access networks. In Proceedings of the second annual ACM conference on Multimedia systems (pp. 57-88). ACM.

SUMMARY OF THE INVENTION

It would be advantageous to assist the client device in optimizing the streaming of the media content to take into account such alternative network links.

The following measures may involve providing a streaming assistance system which may assist in the streaming of the media content to the client device by identifying a media fragment which is likely to be requested by the client device in the (near) future, selecting a network link to be used for the streaming of the media segment, and effecting a prefetching of the media segment via the selected network link. For example, the streaming assistance system may be connected to at least two network links via respective network interfaces. Both network links may have different characteristics, e.g., in terms of throughput, utilization, latency, etc., and may represent different transmission pathways for the media content from the media server(s) to the streaming assistance system. The streaming assistance system may select between both network links when effecting the prefetching of a particular media segment.

In accordance with a first aspect of the invention, a streaming assistance system is provided which may be configured for assisting in a streaming of media content which is streamed from one or more media servers to a client device. The system may comprise:
- a communication interface to the client device;
- a network interface to the one or more media servers;
- a processor subsystem which may be configured to, during a streaming session in which the media content is streamed to the client device:
  - identify a media fragment of the media content which is expected to be requested by the client device based on auxiliary data which is obtained during the streaming session and which is indicative of the media fragment;
  - select a network link to be used for the streaming of the media fragment to the client device by selecting between at least a first network link and a second network link which are available for use in the streaming of the media fragment from the one or more media servers to the client device; and
  - effect a pre-fetching of the media fragment by requesting the media fragment to be streamed via said selected network link.

In accordance with a further aspect of the invention, a computer-implemented method may be provided for assisting in a streaming of media content which is streamed from one or more media servers to a client device. The method may comprise:
- identifying a media fragment of the media content which is expected to be requested by the client device based on auxiliary data which is obtained during the streaming session and which is indicative of the media fragment;
- selecting a network link to be used for the streaming of the media fragment to the client device by selecting between at least a first network link and a second network link which are available for use in the streaming of the media fragment from the one or more media servers to the client device; and
- effecting a pre-fetching of the media fragment by requesting the media fragment to be streamed via said selected network link.

In accordance with a further aspect of the invention, a client device may be provided for receiving media content by streaming from one or more media servers, wherein different representations of the media content are available for streaming by the one or more media servers. The client device may comprise:
- a network interface to a streaming assistance system configured for assisting in the streaming of the media content;
- a processor subsystem which may be configured to, during a streaming session in which the media content is streamed to the client device:
  - via the network interface, send a message to the streaming assistance system which may be indicative of one or more media fragments which are expected to be requested by the client device, such as an AnticipatedRequests SAND (Server And Network assisted DASH) message; and
  - via the network interface, send a message to the streaming assistance system which may be indicative of accepted representations of the media fragment, such as an AcceptedAlternatives SAND message.

In accordance with a further aspect of the invention, a computer-implemented method may be provided for receiving media content by streaming from one or more media servers, wherein different representations of the media content are available for streaming by the one or more media servers. The method may comprise, during a streaming session in which the media content is streamed:
- via a network interface, send a message to a streaming assistance system which may be configured for assisting in the streaming of the media content, wherein the message may be indicative of one or more media fragments which are expected to be requested by the client device, such as an AnticipatedRequests SAND (Server And Network assisted DASH) message; and
- via the network interface, send a message to the streaming assistance system which may be indicative of accepted representations of the media fragment, such as an AcceptedAlternatives SAND message.

In accordance with a further aspect of the invention, a computer-readable medium may be provided comprising transitory or non-transitory data representing a computer program. The computer program may comprise instructions for causing a processor system to perform either of both computer-implemented method.

The above measures involve providing a system which may be configured to assist a client device in streaming of media content, in that it may prefetch one or more media fragments of the media content. Here, the term 'prefetching' may refer to a requesting of a media fragment before such a request is made by the client device.

The streaming assistance system may be connected to the one or more media servers via at least two different network links, with the term 'link' referring to a communication channel that connects two or more devices. Each network link may be a physical network link or a logical network link that uses one or more physical network links or shares a physical network link with other network links. The different network links may provide alternative transmission pathways for the media content from the one or more media servers to the streaming assistance system. Such different network links may for example be provided by different networks or network segments which are located upstream of the streaming assistance system and which may for example connect to a core network of a mobile network or to the Internet. In general, a respective network link may be a 'backhaul' network link, referring to a network link to a backhaul network or being provided by a backhaul network, and which typically carries aggregated network traffic, e.g., of different client devices. In other embodiments, a respective network link may be a network link to an access network or being provided by an access network, which access network is only used by the (single) client device. In general, a respective network link may be constituted by a radio access network link, e.g., of a 5G or later generation telecommunication network, or a satellite downlink or a DSL access network link or a fiber-optic network link or any other type of network link. In some embodiments, both network links may have different characteristics, e.g., in terms of throughput, utilization, latency, etc. Both network links may be 'available for' the streaming of the media fragment in that they may in principle be used to stream the media fragment from the media servers to the streaming assistance system.

The streaming assistance system may, during operation, identify a media fragment of the media content which is expected to be requested by the client device. For that purpose, auxiliary data may be used which may be obtained during the streaming session of the client device and which is indicative of the media fragment. Such auxiliary data may take various forms, including but not limited to previous requests of the client device but also include manifests of the streaming session. Having identified a particular media fragment, the streaming assistance system may select a network link to be used for the streaming of the media fragment to the client device. Having selected the network link, a prefetching of the media fragment may be effected via the particular network link, namely by requesting the media fragment to be streamed via the selected network link. The requesting of the media fragment typically involves sending a request to a media server.

The above measures may have the effect that a client device may be assisted in the streaming of the media content by the streaming assistance system prefetching media fragments for the client device. However, unlike known types of streaming assistance systems, the above measures make use of different network links in that the streaming assistance system may dynamically select between these different network links for the prefetching of respective media fragments. For example, the streaming assistance system may perform the selection on a fragment-by-fragment basis. Since such different types of network links typically have different characteristics, for example in terms of throughput, latency or utilization, the streaming assistance system may optimize the media streaming by suitably selecting the network link. For example, if the utilization of the first network link is relatively high compared to the second network link, for example due to a current media fragment being streamed via the first network link, the streaming assistance system may select a second network link for the prefetching and subsequent streaming of the media fragment. The above measures thus provide as advantage that the streaming assistance system may not only prefetch media fragments but may make use of different network links to optimize the streaming of the media fragment to the client device by suitably selecting between the different network links for the streaming of the media fragment, and may in some embodiments also use two or more network links simultaneously, e.g., to prefetch several media fragments simultaneously and achieve bandwidth aggregation.

In some embodiments, the streaming assistance system itself may be connected to two or more of these network links simultaneously. For example, the streaming assistance system may have two different physical interfaces, such as a radio interface and a fiberoptic interface, via which it may access these two network links. Each of these two different physical interfaces may represent an embodiment of the network interface to the one or more media servers as previously described. The prefetching via the selected network link may be effected by sending the prefetching request via the respective network interface to the one or more media servers. In other examples, the streaming assistance system may have one physical network interface via which the two or more network links are reachable, for example via different virtual networks or via different network routings. In such examples, the first network interface and the second network interface may be embodied by one physical network interface but may be represented by two different types of network interfaces on a network level, for example as separate virtual network interfaces in software. The prefetching via the selected network link may for example be effected by sending the prefetching request via the respective virtual network interface, and/or by using techniques such as 'source-based muting' or 'policy-based routing' which are known per se in network traffic muting. Each virtual network interface, but also the single physical network interface, may represent an embodiment of the network interface to the one or more media service as previously described. In other embodiments, the streaming assistance system may itself not have direct or even indirect connectivity to the network links but may via the network interface to the one or more media servers nevertheless effect a prefetching via the selected network link, for example by identifying the selected network link to the one or more media servers. In general, even if the streaming assistance system is not directly or even indirectly connected to the network links, the streaming assistance system may nevertheless effect the streaming via the selected network link, e.g. using Multiprotocol Label Switching (MPLS) or similar techniques in which packets may be labeled or marked and in which a network link may be selected upstream of the streaming assistance system based on said labels or markings.

In an embodiment, the processor subsystem may be configured to select the network link based on at least one of:
the selected network link being a different one from another one of the first network link and the second network link which is used for streaming a current media fragment of the media content to the client device or for prefetching a current media fragment for the client device;
throughput information being indicative of a throughput of the first network link and/or the second network link;
latency information being indicative of a latency of the first network link and/or the second network link; and
utilization information being indicative of a network utilization of the first network link and/or the second network link by other client devices.

The streaming assistance system may take various considerations into account when selecting a network link to be used for the prefetching of the media fragment. For example, the streaming assistance system may switch between the network links for successive media fragments. For example, if a current media fragment is streamed via the first network link to the client device, the streaming assistance system may select the second network link for the streaming of a following media fragment, for example on the basis of having explicit knowledge of the current media fragment being streamed via the first network link, or by simply alternating between both network links. Other considerations include, but are not limited to a throughput, a latency and a network utilization of a respective network link. The throughput and/or the latency may be statically defined for a particular network link, but may also be dynamically determined, e.g., by measurements performed by the streaming assistance system in a manner as known per se, or by such measurements being made available to the streaming assistance system. Similarly, the network utilization may be based on measurements made by the streaming assistance system or by another entity. By taking one or more of the above considerations into account, the streaming assistance system may optimize the streaming of media fragments via the network links. For example, if it is known that the first network link is temporarily limited in throughput, the streaming assistance system may only or predominantly effect a streaming via the second network link. Another example is that the prefetching of several media fragment simultaneously may be distributed over all network links so as to distribute the network bandwidth and thereby avoid congestion in individual network links.

In an embodiment, different representations of the media fragment representing different quality versions of the media fragment may be available for streaming by the one or more media servers, and the processor subsystem may be configured to, if the first network link is expected to have a lower latency and lower bandwidth than the second network link, request an initial set of media fragments to be streamed via the first network link and a following set of media fragments to be streamed via the second network link. For example, the first network link may be a terrestrial radio network offering low latency but also low bandwidth, while the second network link may be a satellite downlink offering high bandwidth but also high latency. In such an example, initial media fragments may be requested to be streamed via the terrestrial radio network to allow play-out at the client device to be started as quickly as possible, while subsequent media fragments may be streamed in higher quality via the satellite downlink. As the subsequent media fragments are prefetched by the streaming assistance system, it may be avoided that the higher latency of the satellite downlink causes the play-out to be interrupted.

In an embodiment, the processor subsystem may be configured to identify multiple media fragments which are expected to be requested by the client device, and to effect a prefetching and streaming of at least two of the multiple media fragments in parallel using the first network link and the second network link. Thereby, the streaming assistance system may effectively use the network links for bandwidth aggregation when prefetching media fragments for the client device. Effectively, the streaming assistance system may split the streaming between the network links, and may thus be referred to as a 'traffic splitting' system.

In an embodiment, the streaming assistance system may be configured to receive the media fragment from the one or more media servers and to, at least one of
 cache the media fragment;
 cache a part of the media fragment and forwarding another part of the media fragment to the client device without caching; and
 forward the media fragment to the client device without caching.

The prefetching may take various forms, such as a full caching of the media fragment, or a caching of a first part of the media fragment while a second part of the media fragment is directly forwarded to the client device without caching. In some embodiments, the prefetching may be timed such that the media fragment may be forwarded to the client device without caching. This may be particularly advantageous for high-latency but high-bandwidth connections in which caching, which otherwise may be used to compensate for intermittent network congestions, may not be needed but in which the prefetching may compensate for the high latency of the connection.

In an embodiment, the streaming assistance system may be one of:
 an edge node or a distributed system of edge nodes of a communication network to which the client device is connected via an access network, wherein the communication interface is a network interface to the access network;
 a part of the client device, wherein the communication interface is an internal interface of the client device; and
 a distributed system of network nodes, distributed into a first part and second part, wherein the second part comprises a first network interface to the first network link and a second network interface to the second network link, and wherein the first part is located downstream of the second part and comprises the communication interface to the client device, wherein the first part is configured to select a representation of the media fragment based on quality of service (QoS) information and to initiate the pre-fetching, wherein the second part is configured to provide the quality of service information to the first part and to select the network link and effect the prefetching.

A location at an edge of a communication network may bring the streaming assistance system in close vicinity of the client device, and may provide a high-bandwidth and low-latency connection to the client device. In this embodiment, a limiting factor in the media streaming may be the upstream network from the edge node. Accordingly, in this embodiment, the streaming assistance system may be particularly advantageous as it may optimize the upstream part of the streaming by using multiple network links. The streaming assistance system may also be part of the client device. In this embodiment, the functionality which controls the streaming of media content, e.g., in the form of a streaming software client, may not need to be modified to be able to prefetch media fragments using different network links. Rather, the streaming assistance system may be part of the client device, for example as a separate software component, and may effect the prefetching for the streaming software client in a manner which is transparent for the streaming software client. Thereby, the client device may be assisted in the streaming of the media content without having to modify the streaming software client or similar functionality of the client device. The streaming assistance system may also be split into two parts, which may be implemented by different network nodes or by the client device and a network node. Such splitting may take into account that a part of the streaming assistance system may communicate with the client device and may thereby be located in a vicinity of the client device while another part of the streaming assistance system may need to be connected to the network links. Both parts may communicate with each other, in that the second part may provide quality of service information relating to one or more of the network links to the first part which may then select a representation (quality) based on the quality of service information. The second part, which may be connected to the two network links, for example via respective interfaces, may then select the network link for the media fragment to be pre-fetched and thereby split the traffic between both network links. The splitting of the streaming assistance system into two parts thus allows respective parts of the functionality of the system to be implemented at respective optimal network locations. The splitting may also achieve separation of concerns. For example, a part controlled by a video streaming service may perform the segment selection (e.g., control the format of the stream), while a part controlled by a network operator may perform link selection and pre-fetching (e.g., tasks related to the network and network delivery).

In an embodiment, the streaming of the media content may use an adaptive streaming technique. In an embodiment, the adaptive streaming technique may be DASH (Dynamic Adaptive Streaming over HTTP), and the streaming assistance system may be a DANE (DASH-aware Network Element). The streaming assistance system may thus be a DANE according to a version of the MPEG DASH standard.

In an embodiment, the auxiliary data may comprise at least one of:
 a message received from the client device during the streaming session which is indicative of the media fragment and that the media fragment is expected to be requested by the client device, such as an AnticipatedRequests SAND (Server And Network assisted DASH) message; and an identification of a current or previous media fragment of the media content which is or has been streamed to the client device.

The streaming assistance system may identify which media fragment is expected to be requested based on a message received from the client device itself. For example, such a message may be an AnticipatedRequests SAND message, and may in general identify the media fragment and indicate that the media fragment is expected to be requested by the client device. The latter may be indicated in an implicit manner, for example by the type of message. Alternatively, the streaming assistance system may determine which media fragment is expected to be requested based on information identifying a current or previous media fragment which is or has been streamed to the client device. Accordingly, the streaming assistance system may determine that one or more media fragments which follow the current or previous media fragment are likely to be requested in the near future by the client device.

In an embodiment, different representations of the media fragment may be available for streaming by the one or more media servers, and where the streaming assistance system may be configured to:

select a representation from the different representations of the media fragment based on further auxiliary data which is indicative of an acceptance of at least a subset of the different representations by the client device; and effect the pre-fetching of the representation of the media fragment by requesting the representation of the media fragment to be streamed via the selected network link.

If different representations of the media fragment are available, for example representing different quality versions of the media fragment in terms of bitrate and/or spatial resolution, the streaming assistance system may not only select a network link for the streaming of the media fragment but may also select a representation of the media fragment. The representation may be selected to be a type of representation which is expected to be accepted by the client device. Such acceptance by the client device may be based on preferences, such as user or service provider preferences, but also based on technical considerations. By way of selecting a representation of the media fragment, the streaming assistance system may adapt the streaming of the media fragment to characteristics of the network link which is selected. For example, if a network link is selected on the basis of having a low latency, but with the network link only having a low bandwidth, a representation of the media fragment may be selected for streaming which has a relatively low bit rate.

In an embodiment, the further auxiliary data may comprise at least one of:

a message received from the client device during the streaming session which is indicative of accepted representations of the media fragment, such as an AcceptedAlternatives SAND (Server And Network assisted DASH) message; and one or more rules which determine the subset of the different representations based on a representation of a current or previous media fragment of the media content which is or has been streamed to the client device, such as one or more rules defining the subset as representations having a same or lower bitrate than the representation of the current or previous media fragment.

The client device may itself indicate which representations of the media fragment are acceptable, for example using the AcceptedAlternatives SAND message. It will be appreciated that such a message may in principle not directly pertain to the media fragment to be pre-fetched but may instead pertain to other media fragments or to the media streaming in general. Nevertheless, the streaming assistance system may interpret such a message to indicate accepted representations of the media fragment which is to be prefetched by the streaming assistance system. As an alternative to such a message, the streaming assistance system may also make use of rules which define which subset of representations is expected to be acceptable to the client device.

In an embodiment, the processor subsystem may be configured to identify a resource locator via which the media fragment can be requested based on at least one of:

a manifest for the streaming session, such as a Media Presentation Description (MPD); and one or more rules which enable the resource locator to be generated from one or more properties of the media fragment.

A manifest is well-suited for the streaming assistance system to be able to prefetch a particular media fragment. Namely the manifest may contain a resource locator for the media fragment, on which basis the streaming assistance system may prefetch the media fragment. As an alternative to such a manifest, one or more rules may be used which may enable the resource locator to be generated by the streaming assistance system based on one or more properties of the media fragment. For example, if a fragment identifier and a quality level of the media fragment is known, such rules may define a resource locator for the particular media fragment. It may therefore not be needed for the streaming assistance system to have access to the manifest to be able to prefetch the media fragment from the media server(s).

In an embodiment, the manifest may be obtained by at least one of:

receiving the manifest from the client device;

receiving a resource locator from the client device, wherein the resource locator enables the streaming assistance system to retrieve the manifest;

receiving a request for the manifest from the client device, forwarding the request to the one or more media servers and caching the manifest after being sent by the one or more media service in response to the request; and effecting a routing of a request for the manifest from the client device via the streaming assistance system and intercepting the manifest after being sent by the one or more media service in response to the request.

The above may be advantageous ways for the streaming assistance system to obtain access to the manifest associated with the current media streaming session.

In an embodiment, the processor subsystem may be configured to identify the media fragment of the media content by identifying at least one of:

a segment of the media content;

a subsegment of a segment of the media content; and a data range of the media content.

The media fragment as prefetched by the streaming assistance system may take various forms, such as a segment of the media content in case the media content is segmented, or a subsegment thereof, or a data range of the media content, e.g., as defined in bytes or as a fraction of the media content with an offset, and which may be retrieved by including the data range as a parameter or as a query string in the request. Splitting traffic on the basis of subsegments may be beneficial in the case of long segments, in which the download time of a long segment may be reduced by pre-fetching a later subsegment in parallel. If there are three or more network links available, subsegments of anticipated requests may also be pre-fetched.

In a further aspect of the invention, a computer-readable medium may be provided comprising transitory or non-transitory data representing a message for transmitting quality of service (QoS) information associated with one or more network links from a first part to a second part of a distributed streaming assistance system.

It will be appreciated by those skilled in the art that two or more of the above-mentioned embodiments, implementations, and/or aspects of the invention may be combined in any way deemed useful.

Modifications and variations of any one of the processor systems, networks and network nodes, methods and/or the computer programs, which correspond to the described modifications and variations of another one of these entities, and vice versa, may be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

FIG. 3A illustrates a request of a segment by a client device and indicates segments which are anticipated to be requested by the client device, while FIG. 3B illustrates a prefetching and streaming of segments via two backhaul network links;

FIG. 4A illustrates a request of a segment, which is comprised of two sub-segments, by a client device and indicates sub-segments which are anticipated to be requested by the client device, while

Figure 1:
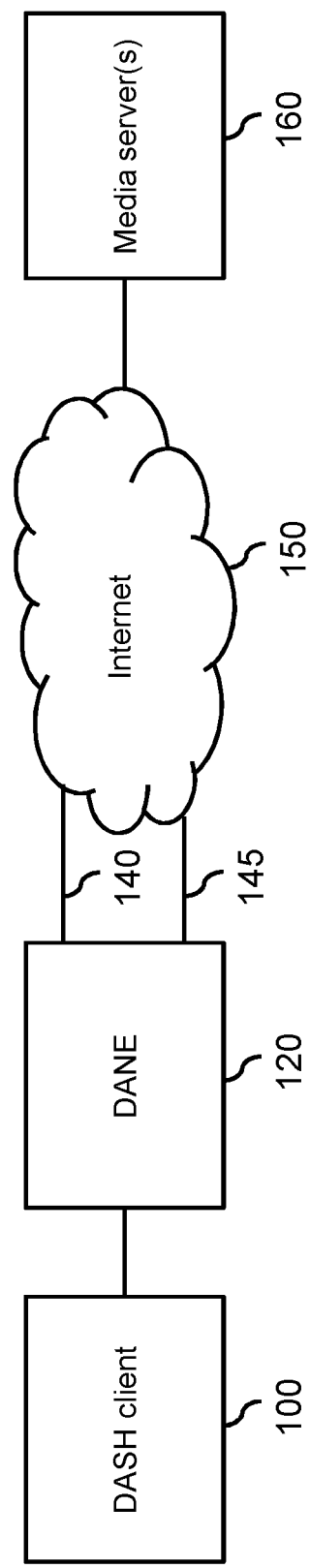
FIG. 1 shows a network diagram comprising a client device in the form of a DASH client, a streaming assistance system in the form of a DANE and having multiple backhaul network connections, and a media hosting by one or more media servers.

It should be noted that items which have the same reference numbers in different figures, have the same structural features and the same functions, or are the same signals. Where the function and/or structure of such an item has been explained, there is no necessity for repeated explanation thereof in the detailed description.

LIST OF REFERENCE AND ABBREVIATIONS

The following list of references and abbreviations is provided for facilitating the interpretation of the drawings and shall not be construed as limiting the claims.

CDN Content Delivery Network
DANE DASH Aware Network Element
DASH Dynamic Adaptive Streaming over HTTP
HDS HTTP Dynamic Streaming
HLS HTTP Live Streaming
HTTP HyperText Transfer Protocol
MPD Media Presentation Description
QoS Quality of Service
SAND Server And Network assisted DASH
UE User Equipment
1-3 network link
10 requested segment
12 anticipated segment
14 accepted alternative segment
16 pre-fetching candidate segment
20 requested segment
21-23 anticipated segment
30 requested segment
30A, 30B requested subsegment
31A-32B anticipated subsegment
50 time
60 representation
100, 105 client device such as a DASH client
120, 125 streaming assistance system such as a DANE
130 first part of streaming assistance system
135 second part of streaming assistance system
140 first network link
145 second network link
150 core network such as Internet
160 media hosting by media server(s)
200 processor system representing streaming assistance system
210 communication interface
220 first network interface
230 second network interface
240 processor subsystem
250 data storage
300 processor system representing client device
310 network interface
320 processor subsystem
330 data storage
400 computer readable medium
410 non-transitory data
1000 exemplary data processing system
1002 processor
1004 memory element
1006 system bus
1008 local memory
1010 bulk storage device
1012 input device
1014 output device
1016 network adapter
1018 application

DETAILED DESCRIPTION OF EMBODIMENTS

The following embodiments describe a streaming assistance system and corresponding computer-implemented method within the context of MPEG Dynamic Adaptive Streaming over HTTP (DASH), in which the streaming assistance system takes the form of a DASH Aware Network Element (DANE). However, the streaming assistance system may also be implemented within the context of other adaptive streaming techniques, including but not limited to HTTP-based adaptive streaming techniques such as HTTP Live Streaming (HLS), HTTP Dynamic Streaming (HDS) and so-called 'Smooth Streaming' as developed by Microsoft. These adaptive streaming techniques may be considered to be functionally equivalent in respect of a client device being able to request segments of media content from one or more media servers via HTTP. The streaming assistance system may be implemented for each of such types of adaptive streaming techniques, or for other types of streaming techniques having adaptive streaming-type of functionality in as far as being used by the streaming assistance system and/or a client device. For example, an HLS proxy server may be constructed having the functionality of the DANE described in the following.

FIG. 1 illustrates a streaming of media content from one or more media servers 160 to a DASH client 100. Here, the term 'DASH client' is to be understood as referring to a client device, such as a User Equipment (UE), which may be configured as a DASH client, e.g., by running a DASH client service in software or in any other suitable manner. In the following, the terms 'client device' and 'DASH client' are used interchangeably except where otherwise noted, for example when referring specifically to a software component of a client device embodying the DASH client. In the example of FIG. 1, the media streaming is shown to take place at least in part via the Internet 150. However, in general, the streaming may take place via any suitable type of Content Delivery Network (CDN), and may involve the Internet but also telecommunication core networks, transport networks, access networks, etc.

In the example of FIG. 1, a DANE 120 is provided which may be configured to assist in the streaming of the media content from the one or more media servers 160 to the DASH client 100. The DASH client 100 may reach the DANE 120 via an access network, which may for example be a radio access network of a 5G or next generation telecommunication network. Although not shown explicitly in FIG. 1, the DANE 120 may be implemented using so-called Multi-access Edge Computing (MEC) which is known per se and which typically offers low-latency and high-bandwidth network access between the DASH client 100 and the DANE 120. In a specific example, the DANE 120 may be an edge node of the aforementioned 5G or next generation telecommunication network. As also illustrated in FIG. 1, the DANE 120 may have several network links 140, 145, such as backhaul network links, towards the Internet 150 or in general towards other nodes upstream in a Content Delivery Network (CDN). As will be elucidated elsewhere, the network links 140, 145 may be different types of network links, such as a satellite downlink and a terrestrial network link. In other examples, the network links 140, 145 may be of a same type but may be represent different instances of this type, e.g., in the form of different physical connections such as different fiber-optic connections.

The DANE 120 may use the multiple network links for prefetching media content for the DASH client 100 and thereby assist the DASH client 100 in the streaming of the media content. In particular, the DANE 120 may be configured to, during a streaming session of the DASH client 100, identify a media fragment of the media content which is expected to be requested by the DASH client 100 based on auxiliary data which is obtained during the streaming session and which is indicative of the media fragment. Such auxiliary data may take various forms, including but not limited to a manifest, for example in the form of a Media Presentation Description, as also explained elsewhere. The DANE 120 may be further configured to select a network link to be used for the streaming of the media fragment to the DASH client 100 by selecting between at least the first network link 140 and the second network link 145, and effect a pre-fetching of the media fragment by requesting the media fragment to be streamed via the selected network links 140, 145.

For example, the DANE 120 may use the multiple network links for bandwidth aggregation. In case the media content is video content, this may allow the DANE 120 to improve the video quality by increasing the streaming bitrate, namely by requesting video fragments in parallel via respective ones of the multiple network links 140, 145, thereby effectively combining the bandwidth of the multiple network links. In case the multiple network links end up at different nodes in the content delivery network, this may also increase the serving capacity of the content delivery network.

Another use case involves the use of a satellite downlink to improve the streaming performance in remote areas. While a terrestrial network link may be available, the available bandwidth may be low and the performance may be on a best effort basis. A high-bandwidth downlink over satellite may be used to increase the video quality. However, due to the high latency, satellite links may not be suitable for DASH streaming without modifications (e.g., due to high startup times and waiting times in-between segment downloads). The DANE 120 may use the terrestrial network link to serve requests for DASH segments with low delay, but in a low quality, and use the satellite downlink to pre-fetch future segments in a high video quality.

In general, the DANE may prefetch media fragments using two or more network links. To identify which media fragments are to be prefetched and which network data links are to be used, the DANE may combine network quality of service (QoS) information and information about the media content, which may in some embodiments be obtained from the DASH client, for example in the form of the Media Presentation Description (MPD). The DANE may then select when, and over which of the available network links, a media fragment may be prefetched.

In some embodiments, the DANE may be informed by the DASH client itself of which media fragments the DANE is likely to request in the near future. Based on this information, the DANE may prefetch the media fragments using one or more of the available network links. This allows the DANE to prefetch media fragments in parallel (e.g., to increase the overall streaming bitrate) and/or over a preferred network link (e.g., to perform network link load balancing or to reduce costs).

As elucidated elsewhere, the media fragments may take various forms, including but not limited to segments, sub-segments or data ranges. By way of example, the following assumes the media fragments to be segments. However, the examples also apply to other types of media fragments, unless otherwise noted. Furthermore, by way of example, the media segments are assumed to be video segments. However, this is not a limitation, in that also other types of media may be streamed in a segment form, with the DANE assisting in said media streaming.

SAND Messages

Some of the following embodiments may involve the use of SAND messages, which may include but are not limited to the following:

QoSInformation—This message may allow a DANE to inform DASH clients about the available QoS information (e.g., the guaranteed and maximum bitrate between the DANE and the DASH client). DASH clients may take this information into account when requesting segments.

Throughput—This message may allow a DASH client to have knowledge about throughput characteristics and guarantees on the delivery path from DANE to DASH client.

AnticipatedRequests—This message may allow a DASH client to announce to a DANE which segments it is interested in (i.e., which segment the DASH client is likely to request soon).

AcceptedAlternatives—This message may allow a DASH client to inform a caching DANE when it requests a DASH segment that it is willing to accept other (alternative) segments.

ResourceStatus—This message may allow a caching DANE to inform a DASH client about segment availability and caching status of the segments.

DeliveredAlternative—This message may allow a DANE to inform a DASH client that it delivers an alternative segment rather than the requested segment. This message may be a response to the AcceptedAlternatives message from the DASH client.

MaxRTT—This message may allow a DASH client to indicate to the DANE the maximum time of the request, from when the request was issued until the request needs to be completely available at the DASH client.

Specific Example

The following events describe a specific example of the DANE function and the message exchange between the DASH client and the DANE:

1. The DASH client may initiate a new streaming session by downloading the Media Presentation Description (MPD) via the DANE.
2. The DANE may forward the MPD to the DASH client and provide the DASH client with QoS information based on the current network conditions. The DANE may use the QoSInformation message to provide this information.
3. The DASH client may request the first video segment.
4. The DANE may forward the segment request to the one or more media servers using one of the available network links. The DANE may use QoS information when selecting the network link.
5. As part of the request for the video segment, or while downloading the video segment and in a new HTTP request, the DASH client may give the DANE a heads-up about which video segments it is interested in. The DASH client may use the AnticipatedRequests message to give this heads-up. The AnticipatedRequests message may also contain a target time at which the DASH client expects to request the indicated video segment.
6. The DANE may schedule the segments requests, taking into account the (estimated) data size of the segment, the target time, alternative segments, and network capabilities and load of each of the available network links.
7. The DANE may pre-fetch the video segments according to the schedule while the DASH client requests and downloads the video segments from the DANE. During this process the following interactions may take place:
   To improve cache-hits, the may DANE inform the DASH client about the segments that are available in the cache using the ResourceStatus message.
   To further improve cache-hits, the DASH client may list alternative segments that they are willing to accept by adding the AcceptedAlternatives message to the request. When the DANE delivers an alternative segment from the cache, the DANE may send a DeliveredAlternative message to the client.
   To help the DASH client select an appropriate representation, the DANE may send QoSInformation messages based on the available bandwidth, combining the available resources of the different network links.

The DANE may periodically repeat steps 4 to 7.

Identifying the Video Segments

The DANE may request video segments before the DASH client makes the requests at the DANE. For that purpose, the DANE may make use of information about the video streaming session. For example, the DANE may make use of the addresses (e.g., URLs) of the video segments and the properties of the video segments (e.g., segment duration, size and bitrate). In one example, this information may be obtained by the DANE by capturing the MPD while proxy-forwarding the MPD to the DASH client. In this example, besides forwarding the MPD to the DASH client, the DANE may record the properties of the streaming session, such that the DANE is able to recognize segment requests. As also elucidated elsewhere, such type of information may enable the DANE to substitute the segment request with a request for another segment that is perceptually similar (e.g., the segment holds the same video content) but has different encoding properties (e.g., is a different representation of the content).

The MPD may be captured by the DANE if the DASH client requests the MPD through the DANE. It may be ensured that the DASH client requests the MPD through the DANE by using DNS. For example, the hostname that is used in the URL of the MPD may via DNS resolve to the DANE. In another example, requests for DASH resources, which may include requests for the MPD, may be routed to the DANE. This may, for example, be accomplished with Software Defined Networking (SDN) techniques. In another example, the MPD may not have to be requested through the DANE, because the DASH client may actively inform the DANE about the MPD. For example, the DASH client may send the MPD, or a message with a similar structure as the MPD and containing relevant information, to the DANE. In another example, the DASH client may provide the DANE with an URL to the manifest. For example, the DASH client may send the URL of the MPD in a message to the DANE. In another example, the DASH client may append to URL of the MPD to a segment request, such as at least the first segment request, e.g., as part of the header of the request.

Client Side

The DASH client may provide information to the DANE so that the DANE can effectively pre-fetch the video segments using the different network links. In some examples, the DASH client may provide the DANE with explicit information about which segments it is likely to request. For example, after the DASH client is notified that it is being served through a caching DANE, the DASH client may append the following two SAND Status messages to each segment request:

AcceptedAlternatives: This message may allow a DASH client to inform a caching DANE that when the DASH client requests a DASH segment, it is willing to accept other (alternative) segments. This message may include a list of segments, for example specified by the URL of the segment (and potentially a byte-range when a segment is defined as a part of the resource in the URL) and optionally by the required bandwidth to download a segment. The DASH client is able and willing to play each segment that is listed as accepted alternative. See Section 6.4.3. of [2] for the specification of this message.

AnticipatedRequests: This message may allow a DASH client to announce to a DANE which segments it is interested in (e.g., which segment the DASH client is likely to request soon). The message may include a list of segments, for example specified by the URL of the segment (and potentially a byte-range when a segment is defined as a part of the resource in the URL) and optionally a time at which the DASH client expects to request the segment. See Section 6.4.1. of [2] for the specification of this message.

The DASH client may be expected to send consistent messages to the DANE. This means that the list of accepted alternatives may include the same representations in consecutive order when conditions remain the same. Accordingly, the DANE may assume that the list of accepted alternatives as provided by the AcceptedAlternatives message not only applies to a current video segment but also to other video segments that may be requested in the future, unless conditions change (e.g., a resolution change at the client or a drop in battery level), in which case the DASH client may specify a different set of accepted alternatives. With respect to anticipated requests, the list may include a list of consecutive requests, following the requested segment. This list may change when a user seeks to a different point in the video. The DASH client may provide the DANE with information about anticipated requests and accepted alternatives using the HTTP headers of a segment request. Alternatively, the DASH client may send the information to the DANE using directed messages using HTTP POST of via a WebSocket or in any other suitable way.

Example 1. An example of a HTTP request that includes a video segment, a list of anticipated requests, and a list of accepted alternatives, is given below:

GET /streams/big_buck_bunny_2400k_023.m4v HTTP/1.1
Host: my.cdn.com
SAND-AnticipatedRequests: [sourceURL=
~"http://my.cdn.com/streams/
    big_buck_bunny_2400k_024.m4v"~,
targetTime=2019-04-25T14:12:09Z],
    [sourceURL=~"http://
http://my.cdn.com/streams/
    big_buck_bunny_2400k_025.m4v"~,
targetTime=2019-04-25T14:12:19Z]
SAND-AcceptedAlternatives: [sourceURL=
~"http://my.cdn.com/streams/
    big_buck_bunny_1450k_023.m4v"~], [sourceURL=
~"http://my.cdn.com/streams/
    big_buck_bunny_650k_023.m4v"~]

In this example, the DASH client provides the DANE with information using HTTP headers in the request for a video segment. The client requests segment 23 in the representation that is denoted '2400k'. The client is also willing to accept segment 23 in the representations '1450k' and '650k'. Furthermore, the client expects to request segment 24 and 25, where it expects to request the segments at the specified times.

Example 2. An example of a message that includes a list of anticipated requests and a list of accepted alternatives, to be send using HTTP POST or via a WebSocket. In this example, the message is formatted in XML. However, the same information could be formatted in alternative formats, for example JSON.

```
<?xml version="1.0" encoding="UTF-8"?>
<SANDMessage xmlns="urn:mpeg:dash:schema:sandmessage:2016">
    <AnticipatedRequests>
        <Request
            sourceUrl=http://my.cdn.com/streams/big_buck_bunny_2400k_024.m4v
            targetTime="2019-04-25T14:12:09Z">
        </Request>
        <Request
            sourceUrl=http://my.cdn.com/streams/big_buck_bunny_2400k_025.m4v
            targetTime="2019-04-25T14:12:19Z">
        </Request>
    </AnticipatedRequests>
    <AcceptedAlternatives>
        <Alternative
            sourceUrl="http://my.cdn.com/streams/big_buck_bunny_1450k_023.m4v">
        </Alternative>
        <Alternative
            sourceUrl="http://my.cdn.com/streams/big_buck_bunny_650k_023.m4v">
        </Alternative>
    </AcceptedAlternative>
</SANDMessage>
```

Similar to Example 1, the DASH client informs the DANE that it is willing to accept segment 23 in the representations '1450k' and '650k'. Furthermore, according to the XML message, the DASH client expects to request segment 24 and 25, and indicates where and at which specified times it expects to request the segments.

Because the DASH client has typically no knowledge about the network link, nor about the intentions of the DANE to split the traffic over multiple network link, the DASH client may not have to decide when the DANE pre-fetches certain segments. The DASH client may thus request video segments one by one, making the request for a next segment once the download of a previous segment is finished.

Although the DASH client may independently request video segments, it may use information provided by the DANE in Parameters Enhancing Reception (PER) messages, for example to prepare decoding resources or for buffer management. Therefore, in some embodiments, the DANE may provide the DASH client with additional information using QoSInformation, Throughput, ResourceStatus. In addition, the DANE may decide to deliver a DASH client a different representation of the requested video segment. However, the DASH client can accept this representation, because the DANE may only deliver alternatives that are approved by the DASH client in the AcceptedAlternatives message. To inform the DASH client that an alternative segment is delivered, the DANE may send the client a DeliveredAlternative message.

The DANE may indicate that the DANE has information for the DASH client using the HTTP response headers, where the DANE may add a header with the URL to the message. The DASH client may be expected to retrieve this message and to process the message. Alternatively, when the DASH client connects to the DANE via a WebSocket, the DANE may send the message directly to the DASH client.

Example 3. An example of an HTTP response that indicate the available of a message from the DANE is given below.

HTTP/1.1 200 OK
Server: DANE/v1.0
Date: Thu 25 Apr. 2019 14:11:59 GMT
Content-Type: video/x-m4v
MPEG-DASH-SAND: http://my.dane.com/messages/susnws291271

The DASH client may retrieve this message upon requesting the specified URL. An example of such a message is given below.

```
<?xml version="1.0" encoding="UTF-8"?>
<SANDMessage xmlns="urn:mpeg:dash:schema:sandmessage:2016">
  <DeliveredAlternative
    initialUrl=http://my.cdn.com/streams/
       big_buck_bunny_2400k_023.m4v
    contentLocation="http://my.cdn.com/streams/
       big_buck_bunny_1450k_023.m4v">
  </DeliveredAlternative>
</SANDMessage>
```

This message contains information that the DANE delivered a different representation (representation '1450k') than requested (representation '2400k').

Selecting Segments for Pre-Fetching

To provide effective traffic splitting between the different network links, the DANE may pre-fetch video segments and cache the video segments until the DASH client requests the segments. The pre-fetching candidates (e.g., the video segments in the manifest that are candidates for pre-fetching) may be a selection of video segments defined in the manifest that satisfy the following two conditions:

1. The DASH client is able to decode and play the video segment, and
2. The DASH client is likely to request the segment in the near future.

Figure 2:
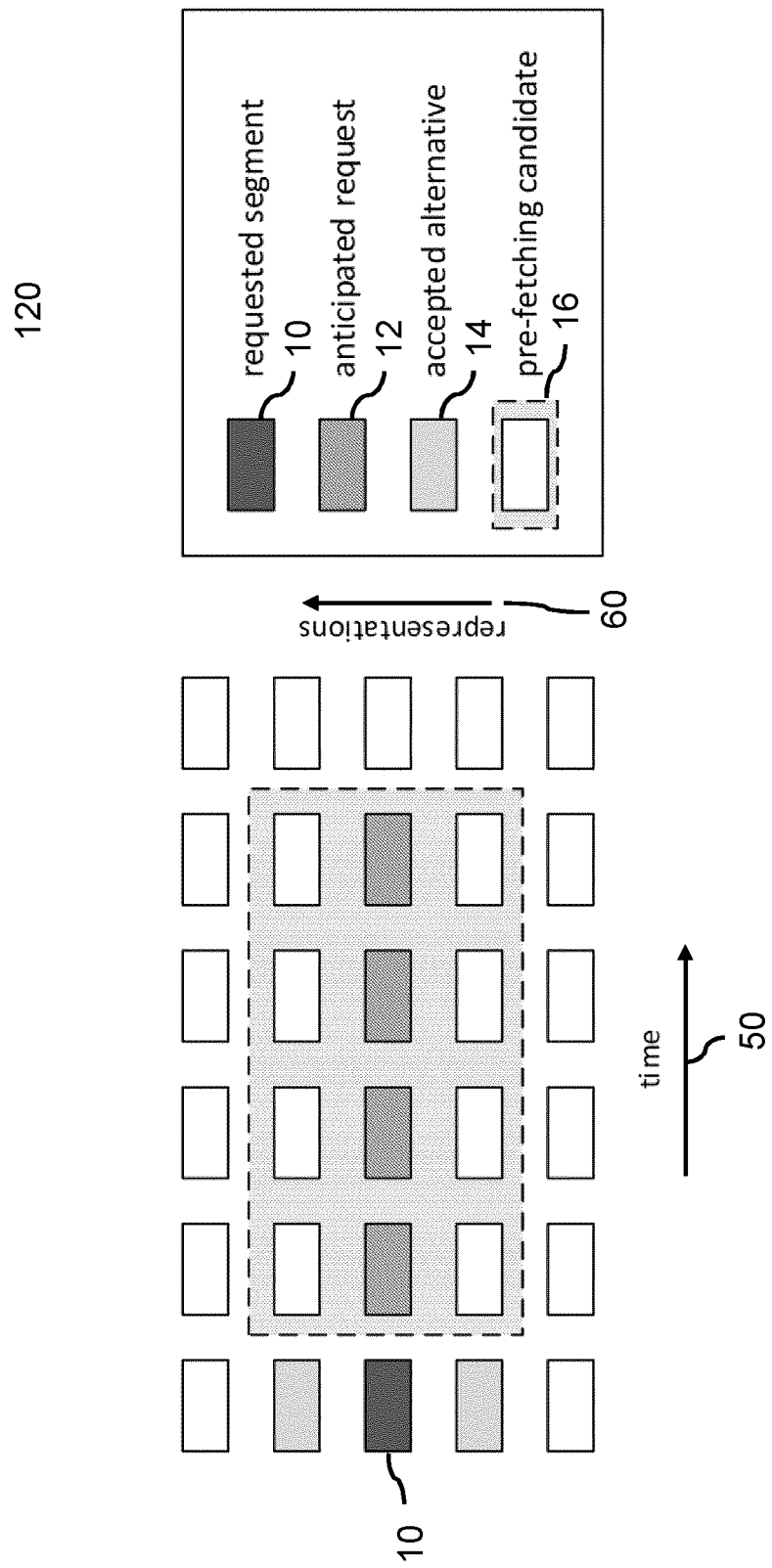
FIG. 2 illustrates a selection of segments to be pre-fetched on the basis of AnticipatedRequests and AcceptedAlternatives SAND message from the client device.

FIG. 2 shows a currently requested segment 10 and a set of candidate segments for being pre-fetched, wherein the set of candidate segments may be determined by the DANE on the basis of AnticipatedRequests and AcceptedAlternatives SAND message from the DASH client. Out of all available segments and representations of the segments, of which a selection is shown in FIG. 2 along the time axis 50 and the representation axis 60, the DANE may identify possible candidates for being prefetched. As indicated previously, the DANE may make the selection of segments based on information provided by the DASH client using the SAND messages AcceptedAlternatives, and AnticipatedRequests. The list of accepted alternatives may define the spatial interest from the DASH client in the form of the set of representations 14 that the DASH client is willing to accept, in that it may indicate alternatives to the currently requested segment 10. Here, the term 'spatial' is used to define an orthogonal axis to the time axis 50. The list of anticipated requests may define the temporal interest in the form of one or more video segments 12 the DASH client is likely to request. The set of segments 16 conforming to the spatial and temporal interest of the DASH client are candidates for pre-fetching. Effectively, the set of candidate segments for prefetching may be constituted by a spatiotemporal interest which may be determined by the DANE on the basis of the DASH client indicating its spatial interest and its temporal interest to the DANE in separate messages.

It is noted that the above process is compliant with standardized SAND messages, but may require the DANE to have knowledge of the MPD. In some other embodiments, such knowledge may not be required, in that segment URLs may be defined using a fixed scheme that includes the specification of the representation (e.g., in Kbit/s) and the segment (e.g., as index). The DANE may use this scheme to compile the segment URLs. Note that, when provided with the list of accepted alternatives, the list of anticipated requests, and knowledge of the URL scheme, the DANE may compose URL for each pre-fetching candidate. In some other embodiments, the DASH client may provide the DANE with a list of URLs for all pre-fetching candidates.

Example 4. An example of a segment URL with variables for the representation and segment index is given below:
http://my.cdn.com/streams/
big_buck_bunny_$representation_$index.m4v Assuming the representation is '2400k' and the segment with index 23 is requested, the URL above can be compiled into the following URL:
http://my.cdn.com/streams/
big_buck_bunny_2400k_023.m4v Request Proxying and Segment Caching The DANE may be configured to serve the DASH client with a video segment as quick as possible, which may involve using a local cache. Depending on the pre-fetching and caching status, the DANE may do one or more of the following:

Forward request: When the DANE receives a video segment request for a video that has not been requested before, nor has been anticipated (e.g., the first requested segment in a streaming session), the DANE may forward the segment request and may provide the DASH client with segment data when it is received from the media server. Note that this may happen in a streaming manner, meaning that the DANE may forward segment data as soon as it receives this data. In addition, the DANE may decide to store the video segment for serving to other DASH clients in the future.

Request ahead: The DANE may have anticipated a segment request from a DASH client, and already made a segment request for the same segment (or an accepted alternative) at the media server. When the video segment data arrives, the DANE may answer the request from the DASH client and forward the data. This mode may be especially useful for connections with high bandwidth but high latency (e.g., when using a satellite link). The time that normally would be lost when creating a network connection (potentially via HTTPS) and making the segment request may be mitigated by sending the segment request ahead based on anticipated requests from the client.

Cache and forward: This case may be similar to 'Request ahead', except that the DANE may already receive segment data before the DASH client has made the request for this segment. In this case, the DANE may cache the data. When the DASH makes the segment request, the cached portion of the data may be served from the local cache in the DANE. The remainder of the segment may be forwarded via the DANE to the DASH client.

Full cache: In this case the segment may be fully pre-fetches by the DANE, based on an anticipated request. The segment may be served from the local cache in the DANE when being requested by the DASH client.

Selecting Network Link

The DANE may split traffic between the different network links on the basis of segment requests. This may mean that a full segment is transported using one network link, but that multiple segments may be requested in parallel. To use multiple network links, the DANE may pre-fetch anticipated segments using a second network link, which may happen in parallel while delivering the requested segments.

Figures 3A, 3B:
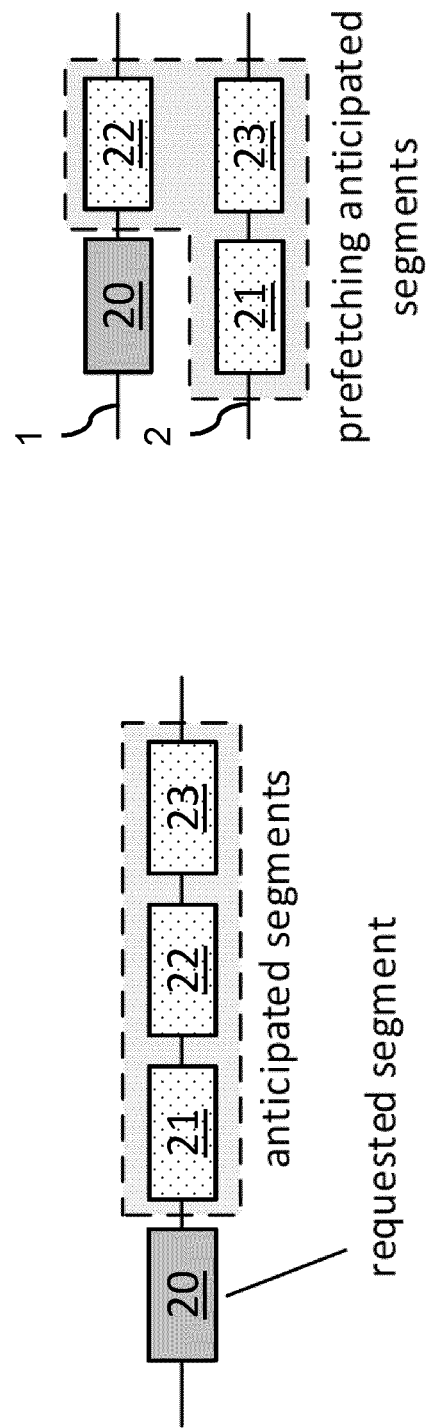

FIG. 3A illustrates a streaming of segments via a single network link, in that a segment 20 is shown which may be currently requested by the DASH client, as well as a selection of candidate segments which are anticipated to be requested and which may comprise a segment 21 which is explicitly indicated by the DASH client to be anticipated to be requested, a segment 22 which is an accepted alternative of another segment which is expected to be requested by the DASH client, and a further segment 23 which is expected to be requested. Accordingly, segment 22 may be the same representation as the requested segment 20, while segments 21, 23 may be a different representation but which is accepted as an alternative to the representation of the requested segment 20. It is noted that segments being a same/different representation is not visually indicated in FIG. 3A and following.

FIG. 3A thus shows how a client device may request segment 20 and identify segments 21, 22, 23 as anticipated requests. Based on this action, the DANE may request and pre-fetch the anticipated segments as shown in FIG. 3B. Namely, FIG. 3B illustrates the prefetching and streaming of segments via two network links 1, 2. It can be seen that while the currently requested segment 20 is streamed via the first network link 1, the segment 21 may already be prefetched via the second link 2. After completion of the streaming of the respective segments 20, 21, the segments 22, 23 may be prefetched via both network links 1, 2.

In general, with pre-fetching by the DANE, a DASH client may request a segment that has already been pre-fetched (e.g., a cached segment). In this case, the DANE may directly serve the cached segment to the DASH client. In the example of FIG. 3B, this may be the segment 21. The DANE may further continue pre-fetching segments based on the information (e.g., the anticipated requests) in the request.

Figure 4B:
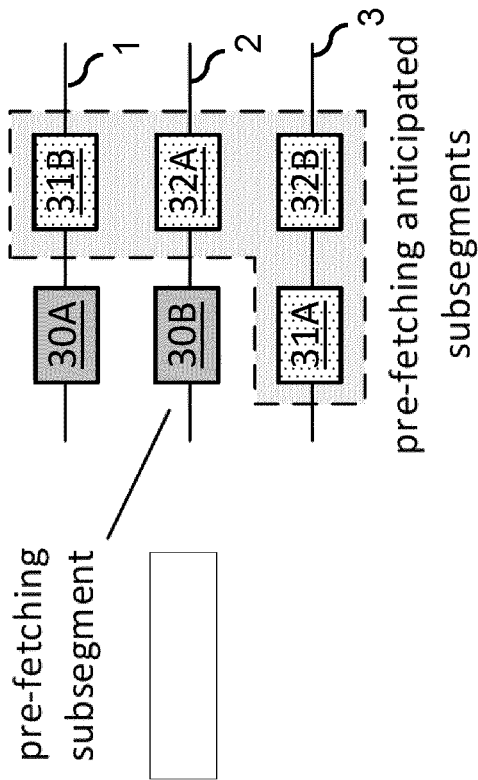
FIG. 4B illustrates the prefetching and streaming on a sub-segment basis via three backhaul network links.
Figure 4A:
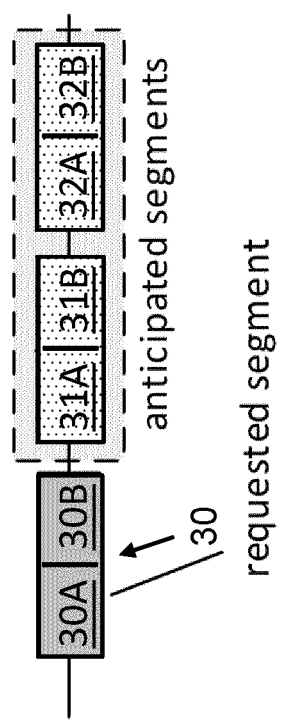

In some other embodiments, the DANE may split traffic on the basis of subsegments. For example, FIG. 4A a shows how a client device may request sub-segments 30A and 30B and identify sub-segments 31A, 31B, 32A, 32B as anticipated requests FIG. 4B shows how the DANE may request and pre-fetch the anticipated segments via three network links 1-3, in that it shows a first subsegment 30A of a first segment 30 being streamed via a first network link 1 while in parallel a second subsegment 30B of the first segment 30 is streamed via a second network link 2 and a first subsegment 31A of a second segment is streamed via a third network link 3. Upon completion of said streaming, a second subsegment 31B of the second segment may be prefetched via the first network link 1, while in parallel a first subsegment 32A of a third segment may be prefetched via the second network link 2 and a second subsegment 32B of the third segment may be prefetched via the third network link 3. During this prefetching, the subsegment 31B may be served to the DASH client from cache.

A subsegment may be a part of a video segment that can be referred to with the segment URL in combination with a specification of the range. The range may be specified as HTTP ranges, for example when the size of a segment is known or can be reasonably estimated, and the server accepts HTTP byte ranges. Alternatively, the URL may include the range (as bytes, or as fraction with offset) as request parameters or a query string. In this case, the server should handle this non-standard range request. Splitting traffic on the basis of subsegments may be beneficial in the case of long segments, in which the download time of a long segment may be reduced by pre-fetching a later subsegment in parallel. If there are three or more network links available, subsegments of anticipated requests may also be pre-fetched.

When requesting a (sub)segment from the one or more media servers, the DANE may select a network link by specifying the output network interface when making the request. Alternatively, when a CDN node can be reached on multiple IP addresses and each address can only be reached from one network link, or when a different network link ends at a different CDN node, the DANE may direct traffic to the network link of choice by using specifying the address of the CDN node. In this case, the host system may take care of muting the request on the correct network link. In general, a network link may be selected by selecting respective physical or virtual network interface, and/or by using techniques such as 'source-based routing' or 'policy-based routing' which are known per se in network traffic routing. In some embodiments, Multiprotocol Label Switching (MPLS) or similar techniques may be used in which packets may be labeled or marked and in which a network link may be selected upstream of the streaming assistance system based on said labels or markings.

Bandwidth Adaptation

The DANE may determine the video bitrate when pre-fetching video segments. The bitrate may be selected such that the segment may be pre-fetched within the allowed timeframe (e.g., before the timepoint provided by the DASH client in the anticipated requests SAND message). For that purpose, the DANE may determine the expected throughput for each of the network links. For example, the DANE may use a statically configured throughput that is guaranteed on a network link, for example as the result of a Service Level Agreement (SLA). Alternatively, the DANE may dynamically obtain the throughput on the network links. In a specific example, the DANE may use network level metrics (e.g., obtained through metering traffic in SDN-enabled switches). Based on the current throughput and network characteristics, the DANE may make a prediction on future throughput. The DANE may also use download speed measurements of previous segment downloads. As such, the DANE may use an adaptation algorithm for the video bitrate that is normally found in DASH clients.

Note that different network links may require different methods for obtaining the throughput, and the DANE may use different methods at the same time for the different network links. Depending on competing traffic from other segments downloads by the DANE, the DANE may choose a video bitrate on the basis of the estimated throughput and already active transfers. Besides using the throughput information for determining the bitrate of a video segment, the DANE may provide this information to the DASH client via a QoSInformation SAND message in a manner as known per se.

DANE Location

From an architectural perspective, the DANE may be comprised of two components: (1) a component for communicating with the DASH client and determining which segments (anticipated and alternative segments) should be pre-fetched, and (2) a component for selecting one or more network links and effecting the pre-fetching. As previously illustrated with respect to FIG. 1, the DANE may be a single entity, such as a network node, or a locally distributed system of network nodes, which may be located near the client, for example in a Multi-access Edge Cloud (MEC). As such, a User Equipment (UE) with a DASH client (which may also simply be referred to as a DASH client) may maintain a network connection to the MEC with the DANE, and the DANE maybe connected to the Internet via one or more network links.

Figure 5:
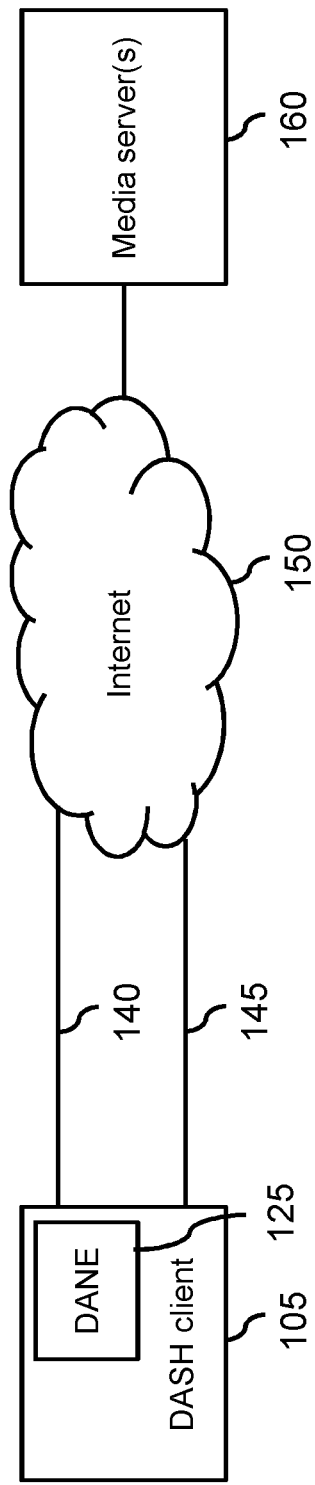
FIG. 5 shows a network diagram in which the streaming assistance system in the form of the DANE is part of the client device, the latter being a DASH client.

In some other embodiments, as also shown in FIG. 5, the DANE 125 may be part of the client device 105 in that it may be implemented by the DASH client. In such embodiments, the DANE 125 may effectively be run besides a DASH client service on the DASH client. This may be useful when a DASH client has multiple active network connections 140, 145 (e.g., a Wi-Fi and LTE connection). The DASH client service may request the video segments at, and send and receive messages (such as AnticipatedRequests and AcceptedAlternatives SAND messages) to and from the DANE 125 running on the same client device. The communication interface between the DASH client service and the DANE 125 may thus be an internal communication interface of the client device 105, instead of an external network interface.

Figure 6:
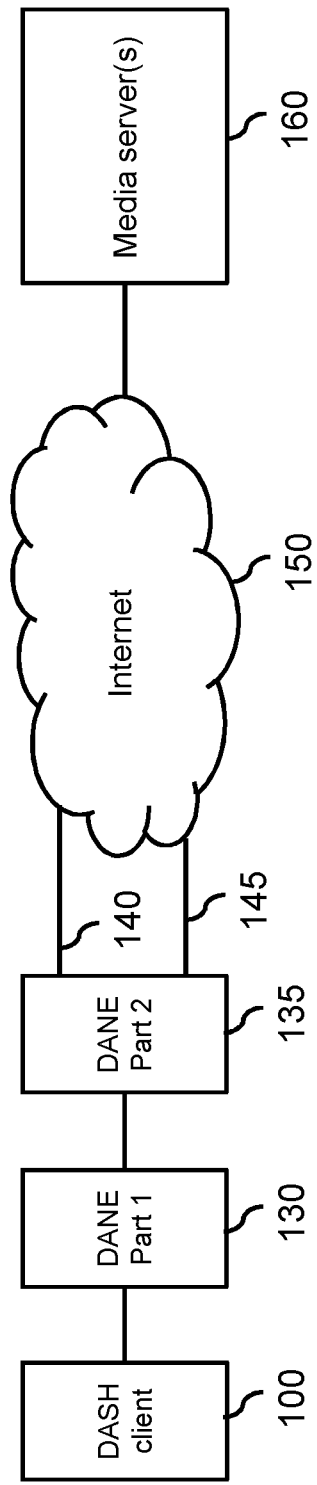
FIG. 6 shows a network diagram in which the streaming assistance system in the form of the DANE is split into two parts, with the second part being connected to two backhaul networks and the first part being downstream of the second part.

In some other embodiments, the two components of the DANE may also be physically separated. In such embodiments, the first component may be implemented by a DANE part running on the client device, while the actual pre-fetching and link selection of the second component may be performed by a network node (e.g., using the MEC). In another embodiment, the two components may be located at two different DANEs with each a different function, as is shown in FIG. 6 where the DANE is split into two parts 130, 135, with the second part 135 being connected to two network links 140, 145 and the first part 130 being downstream of the second part 135. This may be useful to achieve separation of concerns. For example, a DANE controlled by a video streaming service may perform the segment selection (e.g., control the format of the stream), while a DANE controlled by a network operator performs link selection and pre-fetching (e.g. tasks related to the network and network delivery).

When dividing the DANE components over different nodes, the information on QoS associated with the network links may be communicated between the DANEs representing the respective DANE components. This may be done using a new SAND message, QoSInformationRequest, for requesting the available QoS (e.g., available bandwidth) for upcoming requests. The QoSInformationRequest may be contained in the default message envelope [2] and may be specified as follows:

| Field | Cardinality | Description |
| --- | --- | --- |
| MaxTime | 1 | The latest point in time that the segment should be available for download from the cache (e.g., the pre-fetch should be completed). |
| PreferredBandwidth | 0 . . . 1 | The preferred available bandwidth. This field is optional, but can be used to give the pre-fetching DANE an indication of the maximum network load. The pre-fetching DANE may use this information when establishing QoS. |

The pre-fetching DANE may be configured to directly answer the QoSInformationRequest message with a QoSInformation SAND message, indicating the maximum available bandwidth that it can provide for pre-fetching a video segment at the specified time. The sequence of events and the communication between the DASH client and the first DANE, and between the two DANEs may be as follows:
1. The DASH client makes a segment request, which includes AcceptedAlternatives and AnticipatedRequests messages.
2. The first DANE may identify the selection of pre-fetching candidates using the methods described above.
3. For DANE may forward the current segment request to the second (i.e., pre-fetching) DANE. This DANE may serve the segment from cache when available, or forward the request upstream to a media server on the Internet.
4. For each anticipated request:
   a. The first DANE may send a QoSInformationRequest message to the second DANE, indicating the time that the segment should be available. The first DANE may use the timing information available in the corresponding AnticipatedRequests message.
   b. The second DANE may determine the available bandwidth for this segment request and responds to the first DANE indicating this in a QoSInformation message.
   c. The first DANE may select the video bitrate, taking into account the available bandwidth, and sends an HTTP HEAD request to the second DANE. The first DANE may include the MaxRTT SAND message to indicate when the segment should be available in the cache.
   d. The second DANE may react to the HEAD request by pre-fetching the segment (or scheduling the download of the segment in the near future).

Backhaul Connectivity

The connectivity of the DANE to the Internet and the media hosting servers may differ. In some embodiments, the DANE may be connected to the Internet with multiple (fiber) cables, potentially belonging to different network providers. In such embodiments, a backhaul network may be used to bundle resources. By requesting segments in parallel, it may take longer than the segment duration to download a segment, but due to pre-fetching, the effective bandwidth of the stream may be increased. In another embodiment, the DANE acts as a UE. This is the case when the DANE is part of the client device, or when the DANE is located at the first hop in a multi-hop mobile connection. In the second case, a UE may connect via a mobile network to a DANE in the edge. The DANE may connect as UE to the Internet via a satellite link and a terrestrial mobile link. In this embodiment, the DANE may use the terrestrial link for downloading the first segments in the manifest at a low video bitrate, such that video playback can be started quickly. High video bitrate segments may be pre-fetched using the satellite link based on anticipated requests and accepted alternatives provides by the DASH client via SAND messages. Pre-fetching the segments may overcome the high latency of the satellite connection. This may allow the client device to start the video stream quickly and increase the overall video bitrate.

Data Processing Entities

Figure 7:
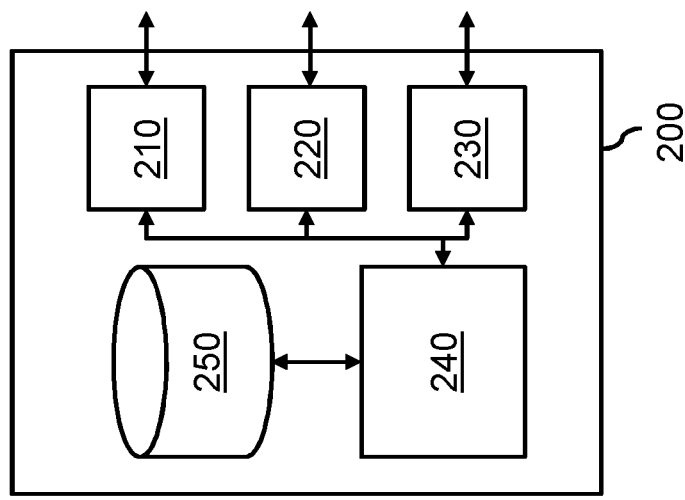
FIG. 7 shows a processor system representing a streaming assistance system such as a DANE.

FIG. 7 shows a processor system 200 which may represent the server assistance system as described elsewhere in this specification, including but not limited to the DANE. The processor system 200 may comprise different interfaces 210-230, which different interfaces 210-320 may comprise a communication interface 210 to the client device, a first network interface 220 to a first network and a second network interface 230 to a second network. All three interfaces may represent different logical interfaces but may in some embodiments be represented by a same physical network interface. In other embodiments, the three interfaces 210-230 may be implemented by a same physical network interface while also representing a same logical interface. In still other embodiments, two or more of the three interfaces may be different physical interfaces, in that each of the two or more interfaces may be connected to a different physical or in some cases transitory transmission medium. In general, each of the interfaces 210-230 may take any suitable form, including but not limited to a wired network interface based on Ethernet or optical fiber or a wireless network interface such as a 5G or later generation radio interface.

The processor system 200 may further comprise a processor subsystem 240, which may be configured, e.g., by hardware design or software, to perform the operations described in this specification in as far as pertaining to the server assistance system. For example, the processor subsystem 240 may be embodied by a single Central Processing Unit (CPU), but also by a combination or system of such CPUs and/or other types of processing units. In general, the processor system 200 may be embodied by a (single) device or apparatus, e.g., a network server. However, the processor system 200 may also be embodied by a distributed system of such devices or apparatuses, e.g., a distributed system of network servers, or as explained with reference to FIG. 5, a combination of a client device and one or more network nodes.

FIG. 7 further shows the processor system 200 comprising a data storage 250, such as a hard disk, a solid-state drive or an array thereof, which may be used by the processor system 200 for storing data. For example, the processor system 200 may cache media fragments or parts thereof using the data storage 250.

In general, the server assistance system may be implemented at least in part by a device or apparatus. The device or apparatus may comprise one or more (micro)processors which execute appropriate software. Software implementing the functionality of the function(s) may have been downloaded and/or stored in a corresponding memory or memories, e.g., in volatile memory such as RAM or in non-volatile memory such as Flash. Alternatively, the function(s) may be implemented in the device or apparatus in the form of programmable logic, e.g., as a Field-Programmable Gate Array (FPGA). In general, each function may be implemented as a circuit.

Figure 8:
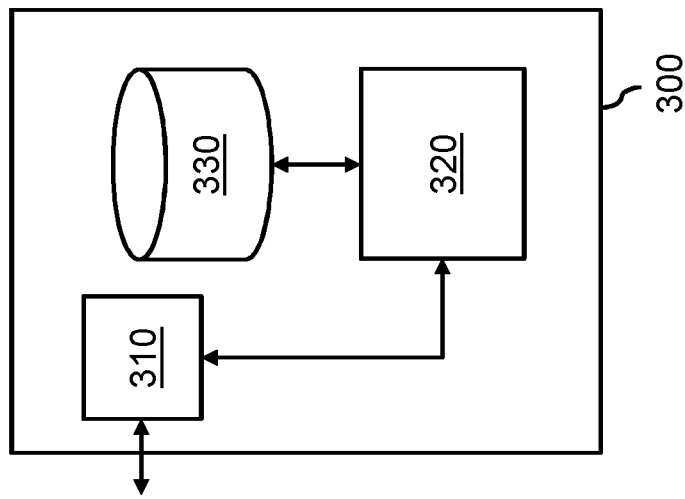
FIG. 8 shows a processor system representing a client device such as a DASH client.

FIG. 8 shows a processor system 300 which may represent the client device as described elsewhere in this specification, including but not limited to the DASH client. The processor system 300 may comprise a network interface 310 for receiving media content and streaming form and for communicating with the streaming assistance system. The network interface 310 may take any suitable form, including but not limited to a wired network interface based on Ethernet or optical fiber or a wireless network interface such as a 5G or later generation radio interface. The processor system 300 may further comprise a processor subsystem 320, which may be configured, e.g., by hardware design or software, to perform the operations described in this specification in as far as pertaining to the client device. For example, the processor subsystem 320 may be embodied by a single Central Processing Unit (CPU), but also by a combination or system of such CPUs and/or other types of processing units. In general, the processor system 300 may be embodied by a (single) device or apparatus, e.g., a smartphone, personal computer, laptop, tablet device, gaming console, set-top box, television, monitor, projector, smart watch, smart glasses, media player, media recorder, head mounted display device, etc. However, the processor system 300 may also be embodied by a distributed system of such devices or apparatuses. In general, the processor system 300 may be a so-called User Equipment (UE) of a telecommunication network, such as a 5G mobile network.

FIG. 8 further shows the processor system 300 comprising a data storage 330, such as a hard disk, a solid-state drive or an array thereof, which may be used by the processor system 300 for storing data. For example, the processor system 300 may temporarily buffer media fragments or parts thereof using the data storage 330.

In general, the client device may be implemented at least in part by a device or apparatus. The device or apparatus may comprise one or more (micro)processors which execute appropriate software. Software implementing the functionality of the function(s) may have been downloaded and/or stored in a corresponding memory or memories, e.g., in volatile memory such as RAM or in non-volatile memory such as Flash. Alternatively, the function(s) may be implemented in the device or apparatus in the form of programmable logic, e.g., as a Field-Programmable Gate Array (FPGA). In general, each function of the client device may be implemented as a circuit.

Figure 9:
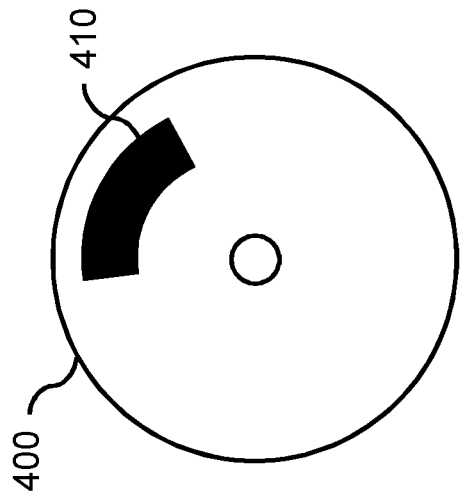
FIG. 9 shows a computer readable medium comprising data.

It is noted that any of the methods described in this specification, for example in any of the claims, may be implemented on a computer as a computer-implemented method, as dedicated hardware, or as a combination of both. Instructions for the computer, e.g., executable code, may be stored on a computer readable medium 400 as for example shown in FIG. 9, e.g., in the form of a series 410 of machine-readable physical marks and/or as a series of elements having different electrical, e.g., magnetic, or optical properties or values. The executable code may be stored in a transitory or non-transitory manner. Examples of computer readable mediums include memory devices, optical storage devices, integrated circuits, servers, online software, etc. FIG. 9 shows by way of example an optical storage device 400.

In an alternative embodiment of the computer readable medium 400 of FIG. 9, the computer readable medium 400 may comprise transitory or non-transitory data 410 representing a data structure of a QoSInformationRequest SAND message as described elsewhere in this specification.

Figure 10:
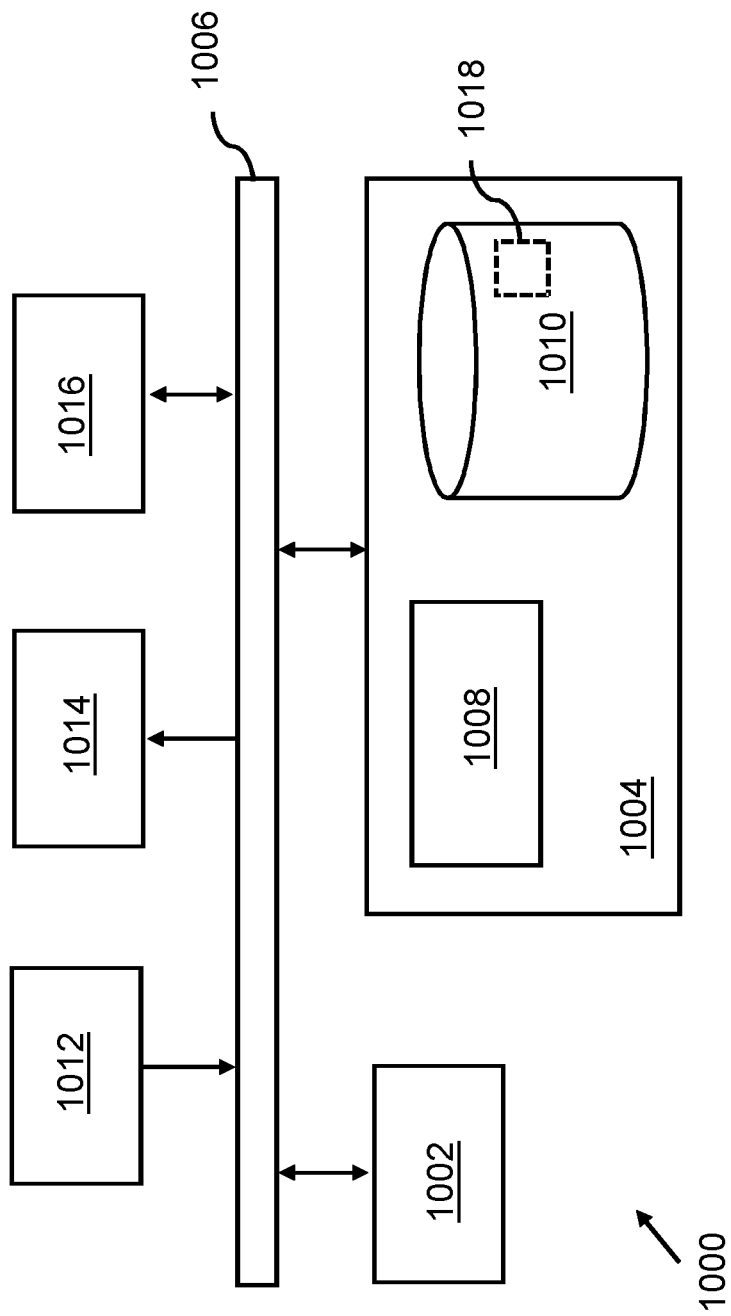
FIG. 10 shows an exemplary data processing system.

FIG. 10 is a block diagram illustrating an exemplary data processing system that may be used in the embodiments described in this specification. Such data processing systems include data processing entities described in this specification, including but not limited to data processing entities implementing functions such as but not limited to the server assistance system, e.g., in the form of a DANE, or the client device, e.g., being a DASH client. The data processing system 1000 may include at least one processor 1002 coupled to memory elements 1004 through a system bus 1006. As such, the data processing system may store program code within memory elements 1004. Further, processor 1002 may execute the program code accessed from memory elements 1004 via system bus 1006. In one aspect, data processing system may be implemented as a computer that is suitable for storing and/or executing program code. It should be appreciated, however, that data processing system 1000 may be implemented in the form of any system including a processor and memory that is capable of performing the functions described within this specification.

Memory elements 1004 may include one or more physical memory devices such as, for example, local memory 1008 and one or more bulk storage devices 1010. Local memory may refer to random access memory or other non-persistent memory device(s) generally used during actual execution of the program code. A bulk storage device may be implemented as a hard drive, solid state disk or other persistent data storage device. The processing system 1000 may also include one or more cache memories (not shown) that provide temporary storage of at least some program code in order to reduce the number of times program code must be retrieved from bulk storage device 1010 during execution.

Input/output (I/O) devices depicted as input device 1012 and output device 1014 optionally can be coupled to the data processing system. Examples of input devices may include, but are not limited to, for example, a microphone, a keyboard, a pointing device such as a mouse, a game controller, a Bluetooth controller, a VR controller, and a gesture-based input device, or the like. Examples of output devices may include, but are not limited to, for example, a monitor or display, speakers, or the like. Input device and/or output device may be coupled to data processing system either directly or through intervening I/O controllers. A network adapter 1016 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1000.

As shown in FIG. 10, memory elements 1004 may store an application 1018. It should be appreciated that data processing system 1000 may further execute an operating system (not shown) that can facilitate execution of the application. The application, being implemented in the form of executable program code, can be executed by data processing system 1000, e.g., by processor 1002. Responsive to executing the application, the data processing system may be configured to perform one or more operations to be described herein in further detail.

In one aspect, for example, data processing system 1000 may implement the server assistance system. In that case, application 1018 may represent an application that, when executed, configures data processing system 1000 to perform the functions described herein with reference to the server assistance system. In another aspect, data processing system 1000 may specifically implement the DANE. In that case, application 1018 may represent an application that, when executed, configures data processing system 1000 to perform the functions described herein with reference to the DANE. In another aspect, data processing system 1000 may implement the client device. In that case, application 1018 may represent an application that, when executed, configures data processing system 1000 to perform the functions described herein with reference to the client device.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or stages other than those stated in a claim. The article "a" or "an" preceding an element does not exclude the presence of a plurality of such elements. Expressions such as "at least one of" when preceding a list or group of elements represent a selection of all or of any subset of elements from the list or group. For example, the expression, "at least one of A, B, and C" should be understood as including only A, only B, only C, both A and B, both A and C, both B and C, or all of A, B, and C. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A streaming assistance system configured for assisting in a streaming of media content which is streamed from one or more media servers to a client device, the system comprising:
a communication interface to the client device;
a network interface to the one or more media servers;
a processor subsystem configured to, during a streaming session in which the media content is streamed to the client device:
identify a media fragment of the media content which is expected to be requested next by the client device based on auxiliary data which is obtained during the streaming session and which is indicative of the media fragment;
select a backhaul network link to be used for the streaming of the media fragment to the client device by selecting between at least a first backhaul network link and a second backhaul network link which are available for use in the streaming of the media fragment from the one or more media servers to the client device; and
effect a pre-fetching of the media fragment by requesting the media fragment to be streamed via said selected backhaul network link before such a request is made by the client device.

2. The streaming assistance system according to claim 1, wherein the processor subsystem is configured to select the backhaul network link based on at least one of:
- the selected backhaul network link being a different one from another one of the first backhaul network link and the second backhaul network link which is used for streaming a current media fragment of the media content to the client device or for prefetching a current media fragment for the client device;
- throughput information being indicative of a throughput of the first backhaul network link and/or the second backhaul network link;
- latency information being indicative of a latency of the first backhaul network link and/or the second backhaul network link; and
- utilization information being indicative of a network utilization of the first backhaul network link and/or the second backhaul network link by other client devices.

3. The streaming assistance system according to claim 1, wherein the streaming assistance system is configured to receive the media fragment from the one or more media servers and to, at least one of:
- cache the media fragment;
- cache a part of the media fragment and forwarding another part of the media fragment to the client device without caching; and
- forward the media fragment to the client device without caching.

4. The streaming assistance system according to claim 1, being one of:
- an edge node or a distributed system of edge nodes of a communication network to which the client device is connected via an access network, wherein the communication interface is a network interface to the access network;
- a part of the client device, wherein the communication interface is an internal interface of the client device; and
- a distributed system of network nodes, distributed into a first part and second part, wherein the second part comprises a first network interface to the first backhaul network link and a second backhaul network interface to the second network link, and wherein the first part is located downstream of the second part and comprises the communication interface to the client device, wherein the first part is configured to select a representation of the media fragment based on quality of service (QOS) information and to initiate the prefetching, wherein the second part is configured to provide the quality of service information to the first part and to select the backhaul network link and effect the prefetching.

5. The streaming assistance system according to claim 1, wherein the streaming of the media content uses an adaptive streaming technique such as DASH (Dynamic Adaptive Streaming over HTTP), and wherein the streaming assistance system is a DANE (DASH-aware Network Element).

6. The streaming assistance system according to claim 1, wherein the auxiliary data comprises at least one of:
- a message received from the client device during the streaming session which is indicative of the media fragment and that the media fragment is expected to be requested by the client device, such as an AnticipatedRequests SAND (Server And Network assisted DASH) message; and
- an identification of a current or previous media fragment of the media content which is or has been streamed to the client device.

7. The streaming assistance system according to claim 1, wherein different representations of the media fragment are available for streaming by the one or more media servers, and where the streaming assistance system is configured to:
- select a representation from the different representations of the media fragment based on further auxiliary data which is indicative of an acceptance of at least a subset of the different representations by the client device; and
- effect the pre-fetching of the representation of the media fragment by requesting the representation of the media fragment to be streamed via the selected backhaul network link.

8. The streaming assistance system according to claim 1, wherein the further auxiliary data comprises at least one of:
- a message received from the client device during the streaming session which is indicative of accepted representations of the media fragment, such as an AcceptedAlternatives SAND (Server And Network assisted DASH) message; and
- one or more rules which determine the subset of the different representations based on a representation of a current or previous media fragment of the media content which is or has been streamed to the client device, such as one or more rules defining the subset as representations having a same or lower bitrate than the representation of the current or previous media fragment.

9. The streaming assistance system according to claim 1, wherein the processor subsystem is configured to identify a resource locator via which the media fragment can be requested based on at least one of:
- a manifest for the streaming session, such as a Media Presentation Description (MPD); and
- one or more rules which enable the resource locator to be generated from one or more properties of the media fragment.

10. The streaming assistance system according to claim 9, wherein the manifest is obtained by at least one of:
- receiving the manifest from the client device;
- receiving a resource locator from the client device, wherein the resource locator enables the streaming assistance system to retrieve the manifest;
- receiving a request for the manifest from the client device, forwarding the request to the one or more media servers and caching the manifest after being sent by the one or more media service in response to the request; and
- effecting a routing of a request for the manifest from the client device via the streaming assistance system and intercepting the manifest after being sent by the one or more media service in response to the request.

11. The streaming assistance system according to claim 1, wherein the processor subsystem is configured to identify the media fragment of the media content by identifying at least one of:
- a segment of the media content;
- a subsegment of a segment of the media content; and
- a data range of the media content.

12. A computer-implemented method of assisting in a streaming of media content which is streamed from one or more media servers to a client device, comprising:
- identifying a media fragment of the media content which is expected to be requested next by the client device based on auxiliary data which is obtained during the streaming session and which is indicative of the media fragment;

selecting a backhaul network link to be used for the streaming of the media fragment to the client device by selecting between at least a first backhaul network link and a second backhaul network link which are available for use in the streaming of the media fragment from the one or more media servers to the client device; and effecting a pre-fetching of the media fragment by requesting the media fragment to be streamed via said selected backhaul network link before such a request is made by the client device.

13. A non-transitory computer-readable medium comprising non-transitory data representing a computer program, the computer program comprising instructions for causing a processor system to perform the method according to claim 12.

* * * * *

UNITED STATES PATENT AND TRADEMARK OFFICE
CERTIFICATE OF CORRECTION

| | | |
|---|---|---|
| PATENT NO. | : 12,149,799 B2 | Page 1 of 1 |
| APPLICATION NO. | : 17/635662 | |
| DATED | : November 19, 2024 | |
| INVENTOR(S) | : Lucia D'Acunto, Miodrag Djurica and Jan Willem Martin Kleinrouweler | |

It is certified that error appears in the above-identified patent and that said Letters Patent is hereby corrected as shown below:

On the Title Page

Item [73], delete "s-Gravenhage (NL)" and insert -- 's-Gravenhage (NL) --.

In the Claims

In Claim 4, Column 29, Line 50: delete "(QOS)" and insert -- (QoS) --.

Signed and Sealed this
Eighteenth Day of March, 2025

Coke Morgan Stewart
*Acting Director of the United States Patent and Trademark Office*